(12) United States Patent
So

(10) Patent No.: US 6,944,746 B2
(45) Date of Patent: Sep. 13, 2005

(54) RISC PROCESSOR SUPPORTING ONE OR MORE UNINTERRUPTIBLE CO-PROCESSORS

(75) Inventor: Kimming So, Mesa, AZ (US)

(73) Assignee: Broadcom Corporation, Irvine, CA (US)

( * ) Notice: Subject to any disclaimer, the term of this patent is extended or adjusted under 35 U.S.C. 154(b) by 570 days.

(21) Appl. No.: 10/113,094

(22) Filed: Apr. 1, 2002

(65) Prior Publication Data

US 2003/0188127 A1 Oct. 2, 2003

(51) Int. Cl.$^7$ ............................................. G06F 15/00
(52) U.S. Cl. ........................ 712/34; 712/244; 710/260
(58) Field of Search ........................... 712/34, 35, 244; 710/260–269

(56) References Cited

U.S. PATENT DOCUMENTS

| | | |
|---|---|---|
| 5,887,160 A | 3/1999 | Lauritzen et al. |
| 6,538,656 B1 | 3/2003 | Cheung et al. ............. 345/519 |

FOREIGN PATENT DOCUMENTS

| | | |
|---|---|---|
| EP | 0 793 168 A2 | 9/1997 |

OTHER PUBLICATIONS

U.S. Appl. No. 09/437,208 entitled "Graphics Display System", filed Nov. 9, 1999, Inventor: Alexander G. Macinnis et al.

U.S. Appl. No. 09/641,374 entitled "Video, Audio And Graphics Decode, Composite And Display System", filed Aug. 18, 2000, Inventor: Alexander G. Macinnis et al.

U.S. Appl. No. 09/641,936 entitled "Video And Graphics System With An MPEG Video Decoder For Concurrent Multi–Row Decoding", filed Aug. 18, 2000, Inventor: Ramanujan K. Valmiki et al.

U.S. Appl. No. 09/643,223 entitled "Video And Graphics System With MPEG Specific Data Transfer Commands", filed Aug. 18, 2000, Inventor: Ramanujan K. Valmiki et al.

U.S. Appl. No. 09/640,670 entitled "Video And Graphics System With Video Scaling", filed Aug. 18, 2000, Inventor: Alexander G. Macinnis et al.

U.S. Appl. No. 09/641,930 entitled "Video And Graphics System With A Video Transport Processor", filed Aug. 18, 2000, Inventor: Ramanujan K. Valmiki et al.

U.S. Appl. No. 09/641,935 entitled "Video And Graphics System With Parallel Processing Of Graphics Windows", filed Aug. 18, 2000, Inventor: Alexander G. Macinnis et al.

U.S. Appl. No. 09/642,510 entitled "Video And Graphics System With A Single–Port RAM", filed Aug. 18, 2000, Inventor: Xiaodong Xie.

U.S. Appl. No. 09/642,458 entitled "Video And Graphics System With AnIntegrated System Bridge Controller", Inventor: Alexander G. Macinnis et al.

*Loosley Coupled Synchronization Mechanism Supporting Precise Interrupts*, IBM Technical Disclosure Bulletin, vol. 35, No. 4B, 1992, pp. 83–86, IBM Corp., New York, U.S.

*Primary Examiner*—William M. Treat
(74) *Attorney, Agent, or Firm*—McAndrews, Held & Malloy, Ltd.

(57) ABSTRACT

A system and method for processing instructions in a computer system comprising a processor and a co-processor communicatively coupled to the processor. Instructions are processed in the processor in an instruction pipeline. In the instruction pipeline, instructions are processed sequentially by an instruction fetch stage, an instruction decode stage, an instruction execute stage, a memory access stage and a result write-back stage. If a co-processor instruction is received by the processor, the co-processor instruction is held in the core processor until the co-processor instruction reaches the memory access stage, at which time the co-processor instruction is transmitted to the co-processor.

12 Claims, 6 Drawing Sheets

US 6,944,746 B2

RISC PROCESSOR SUPPORTING ONE OR MORE UNINTERRUPTIBLE CO-PROCESSORS

INCORPORATION BY REFERENCE OF RELATED APPLICATIONS

The following U.S. Patent Applications are related to the present application and are hereby specifically incorporated by reference: patent application Ser. No. 10/114,679, entitled "METHOD OF OPERATING A VIDEO DECODING SYSTEM"; patent application Ser. No. 10/114,797, entitled "METHOD OF COMMUNICATING BETWEEN MODULES IN A DECODING SYSTEM"; patent application Ser. No. 10/114,886, entitled "MEMORY SYSTEM FOR VIDEO DECODING SYSTEM"; patent application Ser. No. 10/114,619, entitled "INVERSE DISCRETE COSINE TRANSFORM SUPPORTING MULTIPLE DECODING PROCESSES"; and patent application Ser. No. 10/114,798, entitled "VIDEO DECODING SYSTEM SUPPORTING MULTIPLE STANDARDS"; all filed on even date herewith. The following Provisional U.S. Patent Applications are also related to the present application and are hereby specifically incorporated by reference: Provisional Patent Application No. 60/369,144, entitled "VIDEO DECODING SYSTEM HAVING A PROGRAMMABLE VARIABLE LENGTH DECODER"; Provisional Patent Application No. 60/369,014, entitled "PROGRAMMABLE VARIABLE LENGTH DECODER"; Provisional Patent Application No. 60/369,210, entitled "DMA ENGINE HAVING MULTI-LEVEL COMMAND STRUCTURE"; and Provisional Patent Application No. 60/369,217, entitled "INVERSE QUANTIZER SUPPORTING MULTIPLE DECODING PROCESSES"; all filed on even date herewith.

FIELD OF THE INVENTION

The present invention relates generally to media decoding systems and, more particularly, to a core processor for a decoding system.

BACKGROUND OF THE INVENTION

A typical reduced instruction set computer (RISC) processor processes instructions in an instruction pipeline. In a typical instruction processing pipeline, instructions are processed sequentially in stages. Typical pipelines contain 3–9 stages. One existing pipeline architecture is a five-stage pipeline that includes an instruction fetch stage, during which the instruction is fetched from memory; an instruction decode stage; an instruction execute stage; a memory access stage, during which memory is accessed for a load/store instruction; and a result write-back stage, during which the result is written to a register file in the processor. Some RISC processors include a co-processor interface through which the RISC processor can intimately issue instructions to another processing element. A processing element that is connected to the RISC processor via the co-processor interface is thus referred to as a co-processor. In existing RISC processors, when an instruction that is being processed is a co-processor instruction, the co-processor instruction is transmitted to the co-processor during the instruction execute stage.

In existing RISC processors, the instruction executed at each stage can raise exceptions or be interrupted. But in order to maintain a manageable order, the exception or interrupt is raised at a fixed stage, say at the memory access stage. This stage will be called the exception raising stage subsequently. When such an event occurs, all instructions before the write-back stage are canceled, and the processor re-starts the execution of the instructions starting with the instruction that was in the memory access stage when the exception/interrupt occurred. In such a scheme, if a co-processor instruction is in the instruction execute stage when an interrupt is received, the co-processor instruction will have been already sent to the co-processor when the interrupt is received. As a result of the interrupt, the co-processor instruction will be cancelled and reissued beginning again at the instruction fetch stage. When the reissued co-processor instruction reaches the instruction execute stage, the co-processor will again be transmitted to the co-processor. Thus, the same co-processor instruction will have been transmitted to the co-processor twice. This condition can cause problems in co-processors in which an issued instruction cannot be cancelled or re-issued. One example of such a co-processor is one that has a consumable buffer storage. With such a co-processor, once a coprocessor instruction is executed, it consumes a certain number of entries of the buffer.

Further limitations and disadvantages of conventional and traditional approaches will become apparent to one of skill in the art through comparison of such systems with the present invention as set forth in the remainder of the present application with reference to the drawings.

SUMMARY OF THE INVENTION

One aspect of the present invention is directed to a method of processing instructions in a computer system comprising a processor and a co-processor communicatively coupled to the processor. Pursuant to the method, instructions are processed in the processor in an instruction pipeline. In the instruction pipeline, instructions are processed sequentially by an instruction fetch stage, an instruction decode stage, an instruction execute stage, a memory access stage and a result write-back stage. If a co-processor instruction is received by the processor, the co-processor instruction is held in the core processor until the co-processor instruction reaches the exception raising stage, at which time the co-processor instruction is transmitted to the co-processor.

Another embodiment of the present invention is directed to a computer system having a processor and a co-processor. The processor processes instructions in an instruction pipeline. In the instruction pipeline, instructions are processed sequentially by an instruction fetch stage, an instruction decode stage, an instruction execute stage, a memory access stage and a result write-back stage. The co-processor is communicatively coupled to the processor and performs processing tasks in response to co-processor instructions provided by the processor. When the processor processes a co-processor instruction, the processor holds the co-processor instruction until the co-processor instruction reaches the exception raising stage, at which time the processor transmits the co-processor instruction to the co-processor.

Another embodiment of the present invention is directed to a computer system having a processor and a co-processor. The processor processes instructions in an instruction pipeline. In the instruction pipeline, instructions are processed sequentially by an instruction fetch stage, an instruction decode stage, an instruction execute stage, a memory access stage and a result write-back stage. The co-processor is communicatively coupled to the processor and performs processing tasks in response to co-processor instructions provided by the processor. When the processor processes a co-processor instruction, it dispatches the instruction to the co-processor at the decode stage or the execution stage, the co-processor can start executing the initial part of the co-processor instruction that does not change the state of the co-processor, the rest of execution cannot be started until the co-processor instruction reaches the exception raising stage.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

DETAILED DESCRIPTION

Figure 1:
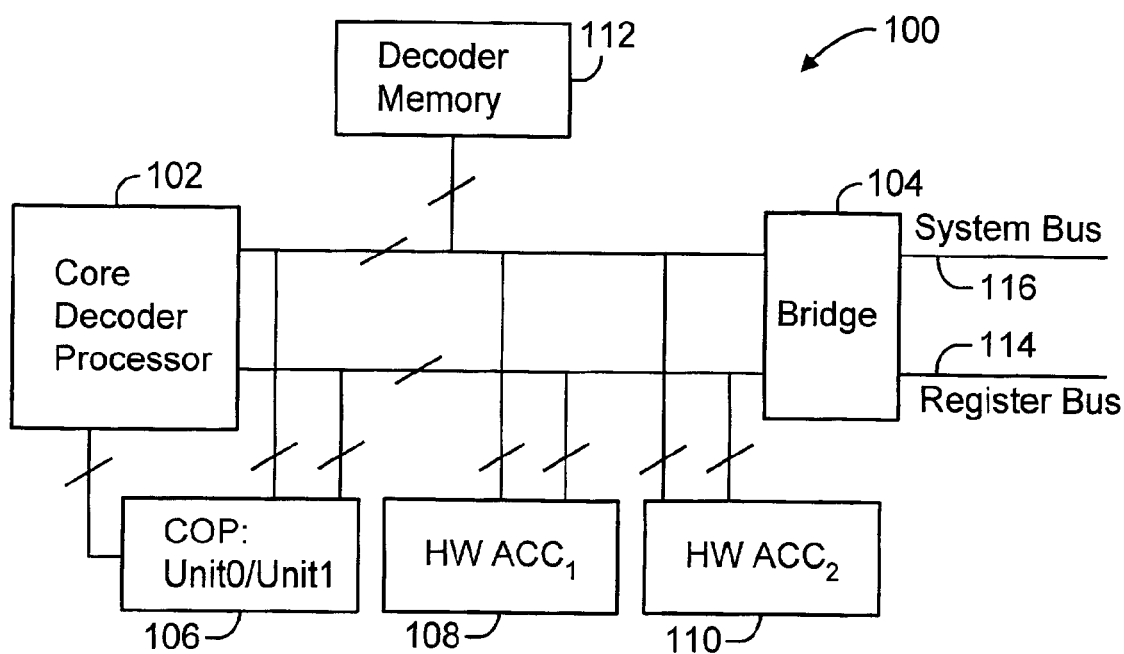
FIG. 1 is a functional block diagram of a computer system according to an illustrative embodiment of the present invention.

FIG. 1 is a functional block diagram of a computer system 100 according to an illustrative embodiment of the present invention. In the illustrative computer system 100 shown in FIG. 1, the computer system is a media decoding system. For purposes of illustration, aspects of the present invention will be described relative to such a media decoding system, and in particular, to a video decoding system. However, it is to be understood that aspects of the present invention can be implemented in any of a multitude of computer systems. Decoding system 100 includes a core decoder microprocessor 102, bridge module 104, co-processor 106, two hardware accelerators 108 and 110, decoder memory module 112, register bus 114 and system bus 116. Register bus 114 and system bus 116 communicate with an external host and external memory (not shown). In an illustrative embodiment, the co-processor comprises two independent and identical units. In an illustrative embodiment, the bridge module 104 is a "switch center" that arbitrates between different modules. The bridge module illustratively includes direct memory access (DMA) functionality.

The acceleration modules 108 and 110 are hardware accelerators that accelerate special decoding tasks that would otherwise be bottlenecks for real-time media decoding if these tasks were handled by the core processor 102 alone. This helps the core processor 102 achieve the required performance. In an illustrative embodiment, the co-processor 106 is also a hardware accelerator that communicates with the core processor 102 via a co-processor interface of the core processor 102. In an illustrative embodiment wherein the decoding system 100 is a video decoding system, the co-processor 106 is a variable-length decoder and the acceleration modules perform one or more video decoding tasks such as inverse quantization, inverse discrete cosine transformation, pixel filtering, motion compensation and deblocking. The system of FIG. 1 is illustrative only. In accordance with the present invention, the decoding system 100 can have any number of hardware accelerators.

The core processor 102 is the central control unit of the decoding system 100. In an illustrative embodiment of the present invention, the core processor 102 receives the data units from the bitstream to be decoded. The core processor 102 prepares the data for decoding. In an embodiment wherein the data being decoded is video data, the data unit comprises macroblock coefficient data. The core processor 102 extracts the control information and data for each data unit. In an illustrative embodiment of the present invention, the co-processor unit 106 assists the core processor 102 in decoding the header information. After extracting the control information and data for each data unit, the core processor 102 illustratively deposits the appropriate control information and data in decoder memory 112. In an alternative embodiment, the core processor 102 provides the processed control information and data directly to the co-processor 106 for processing by the co-processor 106. In an illustrative embodiment of the present invention, the core processor 102 also orchestrates a data unit processing pipeline (such as a macroblock processing pipeline) for the acceleration modules 106, 108 and 110 and fetches the required data from external memory via the bridge module 104. The core processor 102 also handles some data processing tasks. Where decoding system 100 is a video decoding system, picture level processing, including sequence headers, GOP headers, picture headers, time stamps, macroblock-level information except the block coefficients, and buffer management, are performed directly and sequentially by the core processor 102, without using the accelerators 106, 108, 110, except for using a variable-length decoder 106 to accelerate general bitstream parsing.

The bridge module 104 arbitrates and moves data between decoder memory 112 and external memory. The bridge interface 104 illustratively includes an internal bus network that includes arbiters and a direct memory access (DMA) engine. The bridge module 104 serves as an asynchronous interface to the system buses.

Decoder memory 112 is used to store data unit data and other time-critical data used during the decoding process. The co-processor 106 and hardware accelerators 108 and 110 use the decoder memory 112 as the source and destination memory for their normal operation. In an illustrative embodiment of the present invention, decoder memory 112 is a static random access memory (SRAM) unit. The external host has access to decoder memory 112, and the bridge module 104 can transfer data between decoder memory 112 and external memory. The arbiter for decoder memory 112 is in the bridge module 104.

Figure 2:
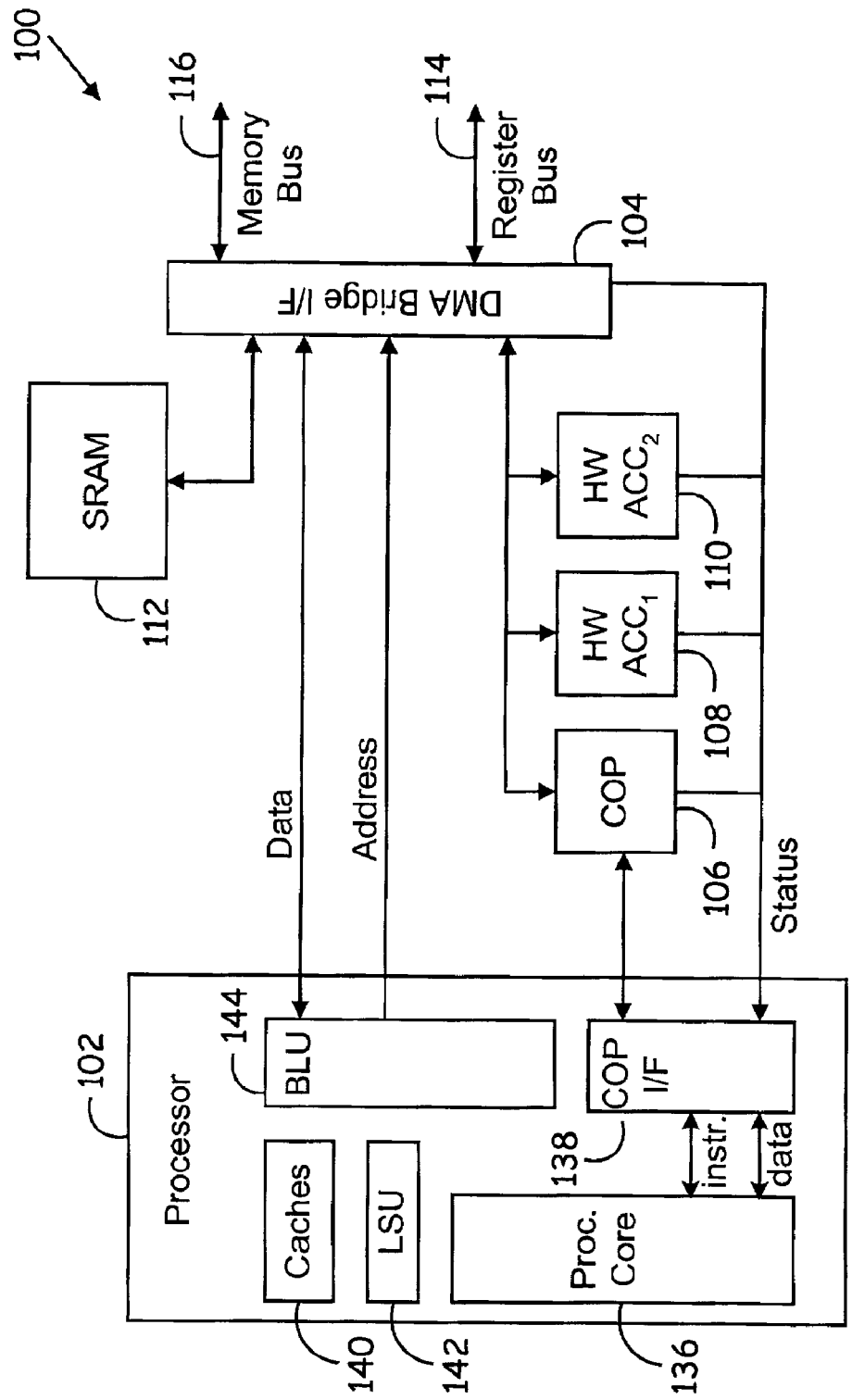
FIG. 2 is a functional block diagram of a computer system according to an illustrative embodiment of the present invention.

In an illustrative embodiment of the present invention, the core processor 102 is a reduced instruction set computer (RISC) processor, such as a MIPS processor, for example. FIG. 2 is a functional block diagram of computer system 100 wherein the core processor 102 is a RISC processor. FIG. 2 shows the interfaces of the core decoder processor 102 to other blocks in decoding system 100 according to an illustrative embodiment of the present invention. In FIG. 2, elements that are equivalent to elements in FIG. 1 are given the same reference numbers as their corresponding elements in FIG. 1. To achieve a higher performance level, module 106 is directly connected to the core processor 102 through a fast co-processor interface 138. Co-processor commands are sent to the co-processor 106 from the processor core 136 via co-processor commands. Results and status are passed between the core processor 102 and the co-processor 106 through move instructions and copy instructions.

The DMA block 104 routs requests between blocks in the decoding system 100. Core processor memory accesses are performed through the bus interface unit (BIU) 144 of the decoder processor 102 and DMA block 104. The core processor 102 is in charge of issuing memory requests to move data between the decoder memory 112 and external memory. Hardware accelerators 108 and 110 receive commands via memory-mapped writes from the core processor 302.

In an illustrative embodiment of the present invention, the core 136 employs a MIPS32 instruction set architecture (ISA). The core 136 has a multiply-divide unit (MDU) that performs fast integer multiply, multiply-accumulate, multiply-subtract, and divide operations. The core 136 also includes a memory management unit (MMU) that uses fixed mapping. In an illustrative embodiment, the MMU does not implement a translation look-aside buffer (TLB) for page-based memory management, as is available in typical MIPS32 ISA processors. The core processor also includes a debugging support unit (DSU). In an illustrative embodiment, the DSU interfaces with an external EJTAG block, which in turn interfaces with a host CPU performing the debugging.

The core processor 102 includes a load store unit (LSU) 142 that processes all types of load (read) and store (write) requests. The bus interface unit 144 processes all memory accesses. One or two data buffers are installed in BIU 144 for buffering incoming and outgoing data between the core processor 102 and decoder memory 112 and system memory. As an example, a write buffer stages any memory-bound data so that the core processor 102 need not wait until the store data are actually placed in the memory. Without such a buffer, in the case of cache misses and non-cacheable reads, the core processor 102 would be stalled until the data is returned. The core processor 102 also includes instruction and data caches 140.

Figure 3:
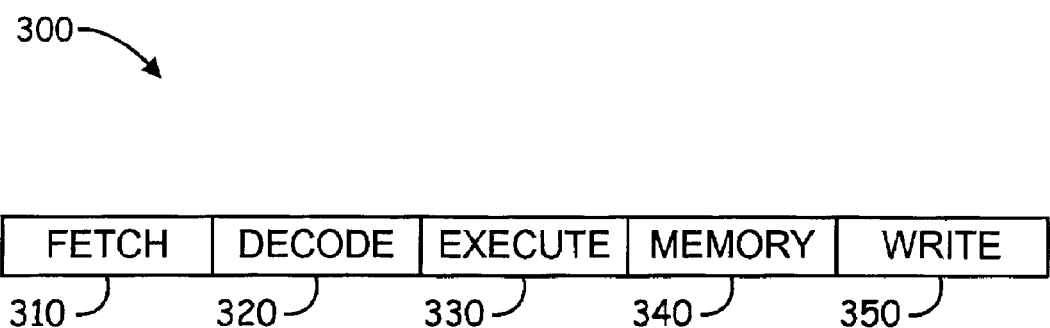
FIG. 3 is a chart showing a core processor instruction pipeline according to an illustrative embodiment of the present invention.

In an illustrative embodiment of the present invention, the core processor 102 is based on an instruction pipeline 300, as shown in FIG. 3. The illustrative instruction pipeline shown in FIG. 3 includes five stages. The five stages of the core processor pipeline are instruction fetch stage 310, instruction decode stage 320, instruction execute stage 330, memory access stage 340 and write-back stage 350. There can be up to five instructions simultaneously being executed in the five-stage pipeline. In an alternative embodiment of the present invention, the core processor 102 is based on a six-stage pipeline that includes two instruction fetch stages. In the first instruction fetch stage, the instruction is retrieved from the instruction cache. In the second instruction fetch stage, branch handling and hit/miss resolution are performed with respect to the instruction. There can be up to six instructions simultaneously being executed in the 6-stage pipeline.

Referring again to FIG. 2, the co-processor 106 is directly connected to the core processor 102 through a co-processor interface 138 and the co-processor 106 is architected as a co-processor to the decoder processor 102. That is, the co-processor 106 can operate on a single-command basis where the decoder processor 102 issues a command (via a co-processor instruction) and waits (via a move-from-coprocessor instruction) until it is executed by the co-processor 106, without polling a status register in the co-processor 106 to determine completion of the command. In an illustrative embodiment, the core processor 102 makes available a co-processor usability bit in a system control status register to activate the co-processor 106. The core processor 102 detects co-processor instructions and passes them to the co-processor 106 to execute. The core processor 102 decodes and executes co-processor move instructions to transfer data between the registers in the co-processor interface 138 and the general registers in the processor core 136. The core processor 102 executes co-processor copy instructions to access the status of each block 106, 108, 110 with a general register in the core processor 102. In an illustrative embodiment, for co-processor instructions that move data between the registers in the co-processor 106 and the general registers in the core processor 102, the pipeline control in the core processor 102 will stall the instruction pipeline 300 when the data are not ready in the co-processor 106.

The pipeline control in the core processor 102 may need to be synchronous with the co-processor 106 when issuing co-processor instructions. The co-processor interface 138 acts as the front end of the modules 106, 108, 110 to perform this type of synchronization with the core processor 102. In an illustrative embodiment of the present invention, the core processor 102 runs at twice the frequency of the other processing modules 106, 108, 110.

In general, there are two types of co-processor instructions: i) instructions issued at the core processor 102 but executed completely at the co-processor 106, and ii) instructions that move data between the core processor 102 and the co-processor 106. Instructions of type i) will be called co-processor commands in this document. The core processor 102 sends co-processor commands to the co-processor 106 directly so that a certain task can be performed. The co-processor 106 decodes individual co-processor commands before execution. Instructions of type ii) include move-to-coprocessor (MTC) instructions, which cause data to be written from the core processor 102 to the co-processor 106, and move-from-coprocessor (MFC) instructions which causes the core processor 102 to read data from the co-processor 106.

In an illustrative embodiment of the present invention, the co-processor 106 includes two co-processor units, $Unit_0$ and $Unit_1$. In this embodiment, the core processor 102 can only issue commands to one of the co-processor units at a time. The active co-processor unit is determined by the value of a co-processor unit-select register. In an exemplary embodiment, when the control register has a value 0, all co-processor instructions are sent to $Unit_0$, and when the control register has a value 1, all co-processor instructions are sent to $Unit_1$. The value in the control register is changed by a copy-control-to instruction and can be read by a copy-control-from instruction. For the rest of this discussion, the co-processor 106 referred to is the active co-processor unit under the current unit-select register value. In an illustrative embodiment wherein system 100 is a video decoding system, the co-processor 106 is a variable length decoder (VLD) that includes two VLD units, one of which is a programmable unit having a code RAM and the other of which is hard-coded to decode bitstreams according to a particular decoding standard.

Figure 4:
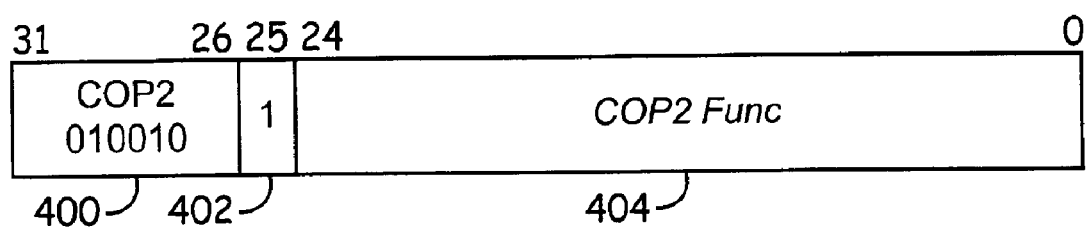
FIG. 4 shows the structure of a co-processor instruction according to an illustrative embodiment of the present invention.

FIG. 4 shows the structure of a co-processor instruction according to an illustrative embodiment of the present invention wherein the core processor 102 is a 32-bit processor. Bits 26–31 (400) indicate that the instruction is a co-processor instruction. Bit 25 (402) indicates whether the instruction is a command (an instruction to be carried entirely by the co-processor) or an instruction that moves data between the core processor 102 and the co-processor 106. In an illustrative embodiment, if bit 25 (402) is high, it indicates that the instruction is a co-processor command. Bits 0–24 indicate the function to be performed by the co-processor 106. Referring to the pipeline diagram in FIG. 3, at instruction decode stage 320, the instruction decoder in the core processor 102 decodes the instruction. The instruction decoder recognizes the instruction as a co-processor instruction by examining bits 26–31 (400), and recognizes that the instruction is a co-processor command because bit 25 is set. The core thus passes the co-processor function (bits 0–24 (404)) to the co-processor. To execute a co-processor command, the co-processor decodes the field.

In the illustrative embodiment wherein the instruction pipeline of the core processor 102 is a five-stage pipeline, like the one shown in FIG. 3, there can be up to five instructions simultaneously being executed in the instruction pipeline (and up to six instructions in the six-stage pipeline of the alternative embodiment). Like in most pipelined processors, an instruction can be cancelled due to interrupts or exceptions in any pipeline stage before the results of the instruction are committed in the write-back stage 350. When an instruction is cancelled, it is restarted from its instruction fetch stage 310. If an interrupt is detected in the execution stage 330, the interrupt is raised in the memory access stage 340, and the instructions from the fetch stage 310 to the execution stage 330 when the interrupt is detected will be cancelled and re-issued. Because a co-processor command can change the co-processor state, reissuing a cancelled co-processor command is complicated to support in the co-processor 106.

To resolve this problem, according to an illustrative embodiment of the present invention, the co-processor interface 138 of processor 102 holds on to a co-processor instruction until the instruction reaches the memory access stage 340, and only then dispatches the co-processor instruction to the co-processor 106. All co-processor instructions, including co-processor commands, MFC instructions and MTC instructions, are dispatched by the core processor 102 to the co-processor 106 at the memory access stage 330 of the core processor pipeline 300. If there is an interrupt or exception raised before the co-processor command reaches the memory access stage 340, the command is cancelled before it is sent to the co-processor 106. It will be re-issued just like all other regular core processor instructions. If no interrupt or exception is raised before the co-processor instruction reaches the memory access stage 340, the co-processor command is sent to the co-processor 106 in the memory access stage 340. This ensures that the co-processor instruction is not cancelled after it is dispatched to the co-processor. As such, a co-processor instruction appears to the core processor 102 like a load or store instruction, in that it is executed in the memory access stage 340 and completed in the write back stage 350. Holding the co-processor instruction until the memory access stage also avoids the ambiguity that would occur if a later-issued instruction arrived at the co-processor 106 before an earlier one.

The data-moving co-processor instructions, such as MFC and MTC, are also dispatched to the co-processor 106 in the memory stage and they are interruptible even if they are waiting for the data to be ready. These co-processor instructions should have no side effect even when they are reissued in the core processor 102 and re-executed in the co-processor 106.

Figure 5:
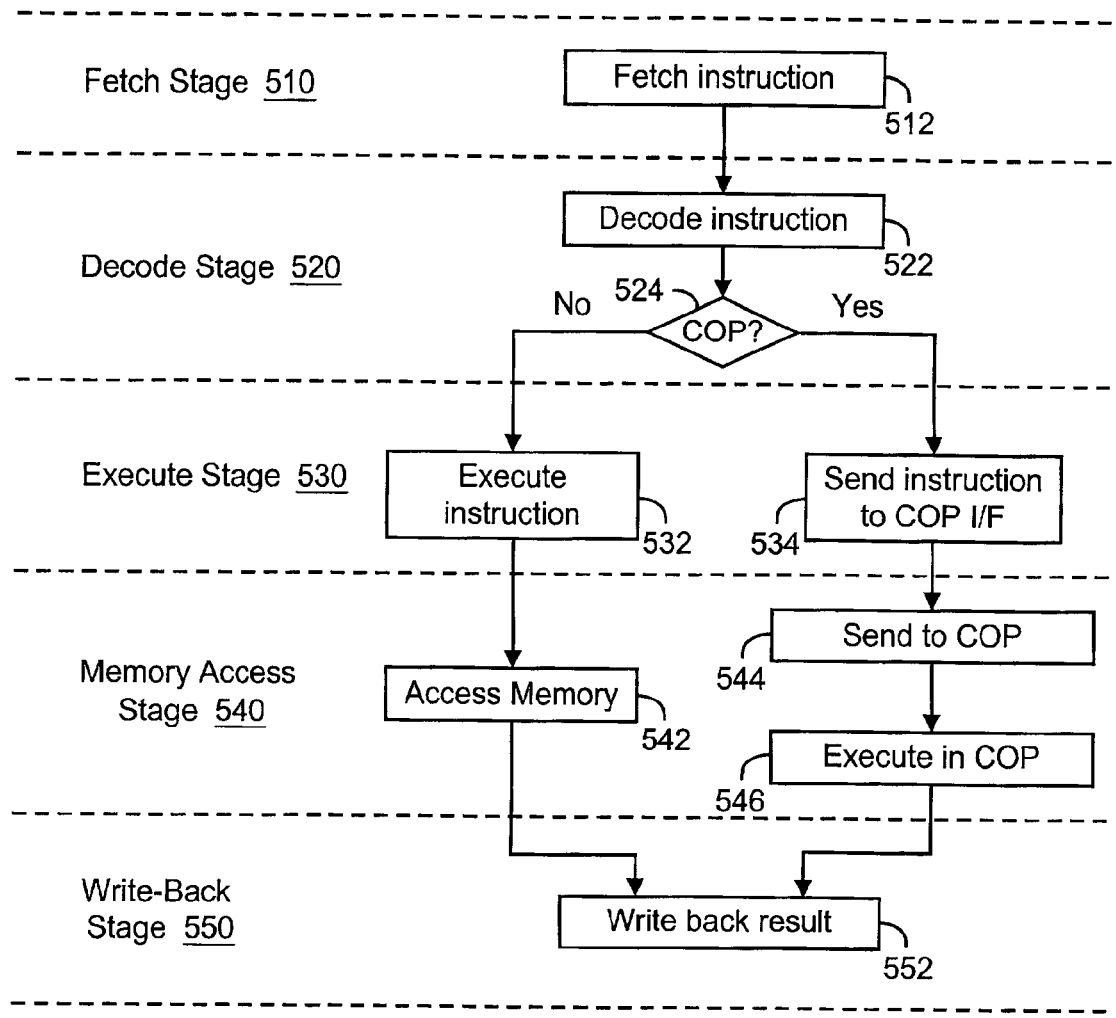
FIG. 5 is a flow chart representing a method of processing an instruction in an instruction pipeline according to an illustrative embodiment of the present invention.

FIG. 5 is a flow chart representing a method of processing an instruction in an instruction pipeline according to an illustrative embodiment of the present invention. The method of FIG. 5 implements a five-stage instruction pipeline corresponding to the one shown in FIG. 3. The pipeline stages are instruction fetch stage 510, instruction decode stage 520, instruction execute stage 530, memory access stage 540 and result write-back stage 550. In instruction fetch stage 510, the instruction to be processed is fetched by the instruction decoder of the core processor 102, as shown by block 512. As explained previously with respect to FIG. 3, an alternative embodiment of the present invention employs a six-stage pipeline having two instruction fetch stages. In instruction decode stage 520, the instruction is decoded by the instruction decoder of the core processor 102, as shown by block 522. The instruction decoder determines if the instruction is a co-processor instruction, as shown by decision block 524.

If the instruction is not a co-processor instruction, in the instruction execute stage 530, the instruction is executed by the core processor 102, as shown by block 532. Then, in memory access stage 540, memory is accessed, as shown by block 542. Finally, in write-back stage 550, the result of the executed instruction is written back to the accessed memory location, as shown by block 552.

If, on the other hand, the instruction is a co-processor instruction, in the instruction execute stage 530, the core 136 of the processor 102 provides the co-processor instruction to the co-processor interface 138 of the processor 102, as shown by block 534. But the co-processor interface 138 does not transmit the instruction to the co-processor 106 until memory access stage 540, as shown by block 544. The co-processor 106 executes the instruction during memory access stage 540, as shown by block 546. Then the result of the co-processor instruction is written back to memory in write-back stage 550, as shown by block 552.

Additionally, according to an illustrative embodiment of the present invention, a co-processor instruction will not itself generate any exceptions in the core processor 102 after it is decoded.

On receiving a co-processor command, the co-processor 106 performs the task the command dictates and sets a command-done signal to indicate the completion of the command by the co-processor 106. The command-done signal can only be cleared by a subsequent co-processor command issued by the core processor 102. In the case where the co-processor 106 is a variable-length decoder, the co-processor 106 is capable of executing a variety of commands issued by the core processor, including, but not limited to, variable-length decode (VLD), get bits, grab bits, start code search, download code table (from main memory 110), transfer data to main memory 110, and VLD block decode. During the execution of a co-processor command, no new commands will be accepted by the co-processor 106. Therefore, before issuing new commands, the decoder processor 102 checks to see if an earlier issued command is finished by polling (MFC read instruction) a command status register in the co-processor 106 that generates the command-done signal.

In an illustrative embodiment of the present invention, the co-processor 106 includes general co-processor registers and co-processor control registers. The general registers are used to hold the data and results of the co-processor commands. The control registers (such as the command status register mentioned above) are used to hold the status and error conditions of the co-processor. In an illustrative embodiment of the present invention, the control registers are also used to hold the status and error conditions of the other functional blocks of the system 100, such as hardware accelerators 108 and 110. The following discussion describes co-processor instructions used to transfer the contents of the co-processor registers to and from the general registers of the core processor 102.

The move-to-coprocessor (MTC) instruction is a register write instruction that is used by the core processor 102 to load the contents of a general register residing in the core processor 102 to a general register in the co-processor 106. The MTC instruction includes one or more "set" bits that indicate the set of co-processor registers to copy the data to.

The move-from-coprocessor (MFC) instruction is a register read instruction used by the core processor 102 to load the contents of a general register in the co-processor 106 to a general register in the core processor 102. One such co-processor register that the core processor 102 may need to read is the command status register. The MFC instruction includes one or more "set" bits that indicate the set of co-processor registers to copy the data to. The move-from-coprocessor instruction also includes a "wait" bit. The move-from-coprocessor instruction behaves differently with respect to reading a co-processor register depending on the value of the wait bit.

In an illustrative embodiment wherein the co-processor 106 runs at half the speed of the core processor 102, a move-from-coprocessor command uses at least two core processor clock cycles for the co-processor to return the read result. Therefore, in an illustrative embodiment, a move-from-coprocessor instruction stalls the core processor pipeline 300 by two core processor clock cycles.

One use of the move-from-coprocessor instruction is the reading of a snapshot value of a register or simply reading back a previously programmed register for verification. In this case, the core processor 102 needn't wait for the command to be completed before reading the source register. In such a case, the wait bit will be low, for example. When the wait bit is low, read results are instantly returned to the core processor 102 without considering whether the data that is being read is updated, or whether the data is valid. The core processor will get the read data instantly (of course there is the fixed one or two clock cycle delay).

Another use of the move-from-coprocessor instruction is the reading of results of a previously issued co-processor command or the status of the co-processor 106. In this case, a previously issued command may not have finished, in which case its results would not be valid and the core processor 102 waits for the command to be completed before reading the source register. Therefore, in an illustrative embodiment, when the wait bit is set, the move-from-coprocessor instruction will not finish its operation, or will wait, until the data to be read is updated and becomes valid. This is done by checking the command-done flag in the co-processor 106 and finishing the read when the co-processor 106 is done with its current task.

The co-processor interface 138 of the core processor 102 is responsible for MFC register decoding. Therefore, the co-processor interface 138 provides the appropriate stall control for the core processor pipeline. MFC instructions can be consecutive with pipeline stalls between them.

At times when the co-processor 106 cannot complete certain tasks or encounters error conditions, it can raise an external interrupt to the core processor 102. This external interrupt can interrupt the core even if the core is stalled due to an outstanding MFC instruction. In an illustrative embodiment, the interrupt will be delayed for all other stall situations, such as a cache miss.

The control registers in the co-processor 106 are used to keep the status and configuration settings of the co-processor 106. In an embodiment wherein the co-processor comprises two co-processor units, the co-processor includes a unit-select register to indicate which unit is active. A status register comprising one or more bits indicates the status of the active unit of the co-processor 106. In an illustrative embodiment, global status registers in the co-processor 106 are used to hold the status and error conditions, i.e., the condition code, of other functional blocks in the system 100, such as hardware accelerators 108 and 110. In an illustrative embodiment, a few bits per module are allocated to each hardware accelerator module 108 and 110 to indicate the condition code of the module. In an illustrative embodiment, except the unit-select register, all of the co-processor control registers are read-only by the core processor 102. Each hardware accelerator resets its condition code bits in its global status registers when it receives commands from the core processor 102, and it sets the condition code bits i) when it completes the commands and is ready to receive another command or ii) when it encounters an error condition. The type of error can be retrieved from a register of the hardware accelerator block by issuing a read of the corresponding memory location.

Copy instructions are used to access the control registers of the co-processor 106. A copy-control-from-coprocessor (CFC) instruction copies the contents of a specified control register to a specified general register in the core processor 102. A copy-control-to-coprocessor (CTC) instruction loads the contents of a specified general register in the core processor 102 into a specified control register in the co-processor 106.

Figure 6:
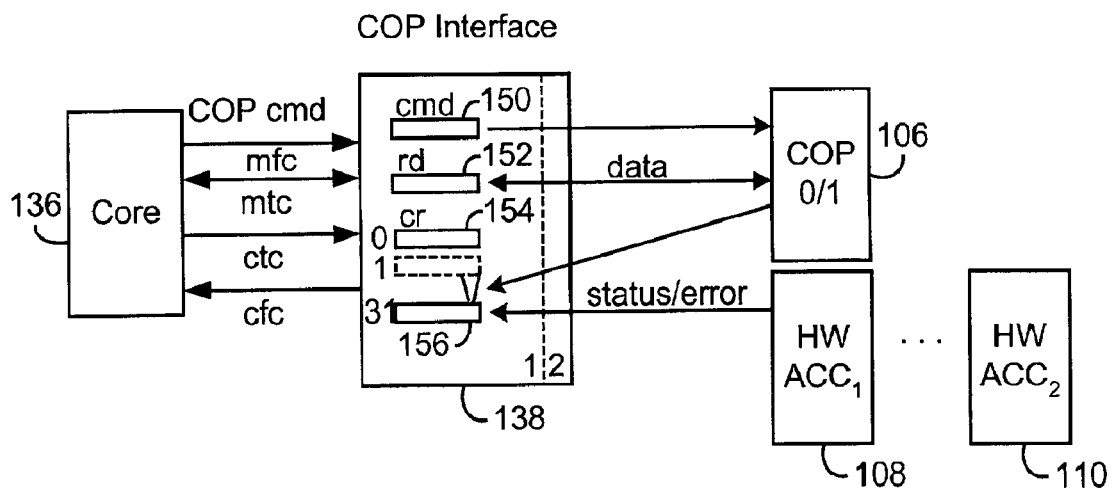
FIG. 6 is a functional block diagram showing buffers of a co-processor interface and their interactions with a processor core, co-processor and hardware accelerators according to an illustrative embodiment of the present invention.

In addition to passing requests and data between the co-processor 106 and the core 136 of the processor 102, the co-processor interface 138 has buffers for holding the data and status in order to reduce access latency. FIG. 6 is a functional block diagram showing some of the buffers of the co-processor interface 138 and their interactions with the processor core 136, co-processor 106 and hardware accelerators 108 and 110. The buffers in the co-processor interface include command status buffer 150 (cmd), data buffer 152 (rd) and control registers 154 and 156. If a co-processor instruction has data to be returned to the core 136, the data are placed at the data buffer 152 at the interface 138 when the co-processor instruction is completed successfully.

The command-done bit stored in command status register 150 is not accessible by the core processor 102. The command-done bit is clear when a co-processor instruction is issued from the core 136 and it's set to 1 when the instruction is completed by the co-processor. This allows the MFC instruction (with "wait" bit=1) to start copying the data from the co-processor 106 to the target general register in the next cycle.

Referring again to FIG. 2, the core processor 102 accesses the registers in the functional blocks such as hardware accelerators 108 and 110 through memory reads and writes. This is achieved by allocating a small sub-segment of memory in a noncacheable memory segment in the core processor's 102 address space. The mapping can be stored in the BIU 144 or the DMA bridge 104. In an illustrative embodiment of the present invention, when the core processor 102 wants to make sure all reads and writes are completed in the system 100, it issues a (noncacheable) read from a special location to a dummy register. The read is sent out to the DMA bridge 104 when the core processor's write buffer is empty. When the DMA bridge 104 receives the read, it will make sure all of the core processor's requests are completed, and then it will return a piece of dummy data to the core processor 102.

The bus interface unit (BIU) 144 is in charge of all memory requests for the core processor 102. The BIU 144 includes a FIFO write buffer to stage outgoing data. The following byte-gathering scheme is implemented on the write buffer to minimize the number of memory store requests. If the core processor 102 performs a copy-back of a data cache line, the dirty line is placed in an entire new entry of the write buffer. If the core processor 102 performs a noncacheable write, the data is placed into the write buffer in one of the following ways. If it's at the beginning of a data entry of predetermined size, the data is placed in the next new entry which will be referred to as the active entry. If the data are next to the previous written data in a data entry boundary, the two requests are combined into one. Data in an entry are ready to be sent to the data bus if i) the data are the size of one full data entry, ii) the entry is not the active one, iii) an exception has occurred, or iv) the core processor 102 is about to send out a read request to the data bus.

The instruction pipeline 300 of the core processor is stalled if a core processor memory store finds the write buffer is full. The write buffer is flushed, i.e., all valid entries are written to the memory, before i) a core processor memory read request can be sent to the memory or ii) the core processor can complete a synchronize instruction. When the data of an entry are written to the data bus, all following valid entries are shifted down.

Although a preferred embodiment of the present invention has been described, it should not be construed to limit the scope of the appended claims. For example, the present invention is applicable to any type computer system employing a co-processor coupled to a main processor through a co-processor interface, including any media decoding systems, such as audio and graphics decoding systems, in addition to the video decoding system illustratively described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method of processing instructions in a computer system comprising a processor and a co-processor communicatively coupled to the processor, wherein the processor includes a co-processor interface communicatively coupled to the co-processor, the method comprising:

(a) processing instructions in the processor in an instruction pipeline wherein instructions are processed sequentially by an instruction fetch stage, an instruction decode stage, an instruction execute stage, a memory access stage and a result write-back stage; and (b) if a co-processor instruction is received by the processor, performing steps of:

(b)(i) providing the co-processor instruction to the co-processor interface during the instruction execute stage: and (b)(ii) transmitting the co-processor instruction from the co-processor interface to the co-processor during the memory access stage.

2. The method of claim 1 further comprising a step (c) of:

(c) if an interrupt or exception is received by the processor, canceling an instruction that is in the instruction execute stage when the interrupt is received and reissuing the instruction starting at the instruction fetch stage.

3. The method of claim 2 wherein if an interrupt or exception is received by the processor when a co-processor instruction is in the instruction execute stage, the co-processor instruction is canceled before the co-processor instruction is transmitted to the co-processor and the co-processor instruction is reissued starting at the instruction fetch stage.

4. The method of claim 1 wherein the co-processor is a processing element for which sending the same co-processor instruction to the co-processor twice decreases the performance of the co-processor.

5. The method of claim 1 wherein the processor is a reduced instruction set computer (RISC) processor.

6. The method of claim 1 wherein the system is a media decoding system, the processor is a core decoder processor and the co-processor is a decoding accelerator adapted to assist the core processor with a decoding function.

7. A computer system comprising:

a processor adapted to process instructions in an instruction pipeline wherein instructions are processed sequentially by an instruction fetch stage, an instruction decode stage, an instruction execute stage, a memory access stage and a result write-back stage, the processor including a co-processor interface; and a co-processor communicatively coupled to the co-processor interface of the processor and adapted to perform processing tasks in response to co-processor instructions provided by the processor;

wherein the processor is adapted to provide a co-processor instruction to the co-processor interface during the instruction execute stage and wherein the co-processor interface is adapted to transmit the co-processor instruction to the co-processor during the memory access stage.

8. The system of claim 7 wherein if an interrupt is received by the processor, the processor is adapted to cancel an instruction that is in the instruction execute stage when the interrupt is received and to reissue the instruction starting at the instruction fetch stage.

9. The system of claim 8 wherein if an interrupt is received by the processor when a co-processor instruction is in the instruction execute stage, the processor is adapted to cancel the co-processor instruction before the co-processor instruction is transmitted to the co-processor and to reissue the co-processor instruction starting at the instruction fetch stage.

10. The system of claim 7 wherein the co-processor is a processing element for which sending the same co-processor instruction to the co-processor twice decreases the performance of the co-processor.

11. The system of claim 7 wherein the processor is a reduced instruction set computer (RISC) processor.

12. The system of claim 7 wherein the system is a media decoding system, the processor is a core decoder processor and the co-processor is a decoding accelerator adapted to assist the core processor with a decoding function.

* * * * *